June 9, 1953　　　　　L. S. GUTHOF　　　　　2,641,246
COOKING DEVICE

Filed May 20, 1952　　　　　　　　　　　4 Sheets-Sheet 1

INVENTOR
LUIS SAMUEL GUTHOF

BY Kimmel & Crowell
ATTORNEYS

June 9, 1953 L. S. GUTHOF 2,641,246
COOKING DEVICE
Filed May 20, 1952 4 Sheets-Sheet 2
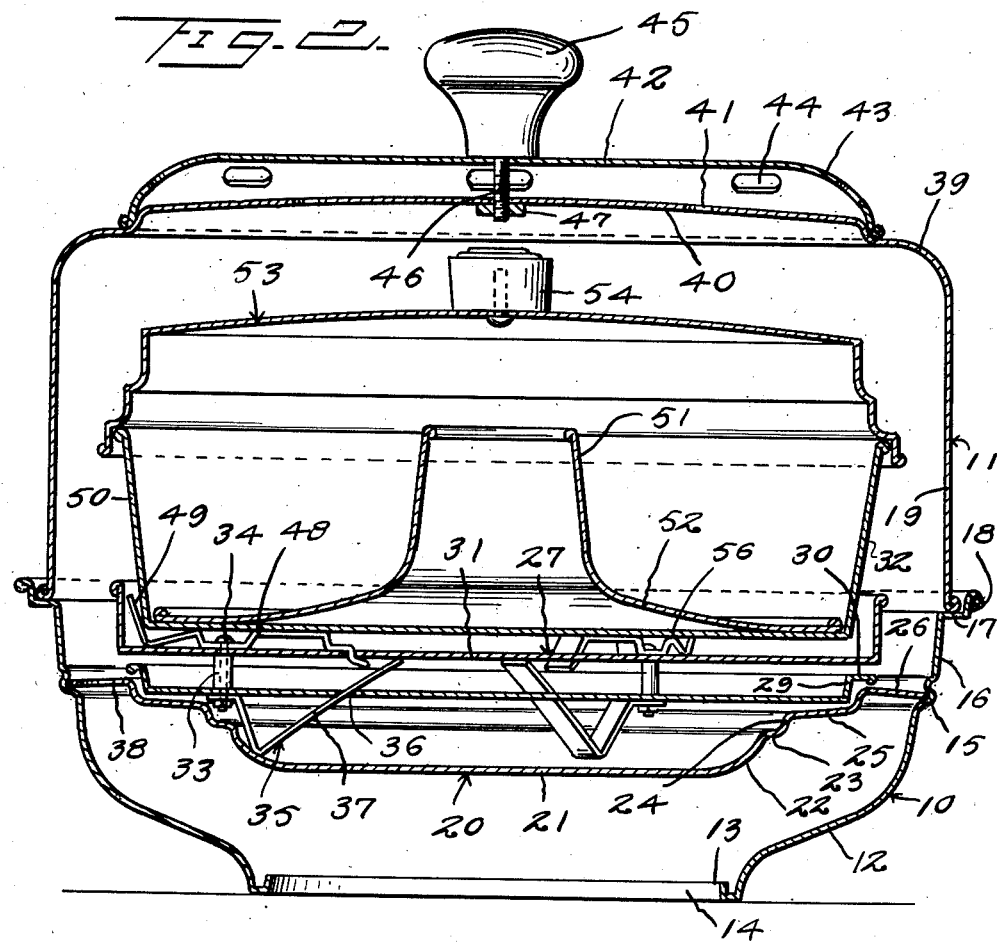
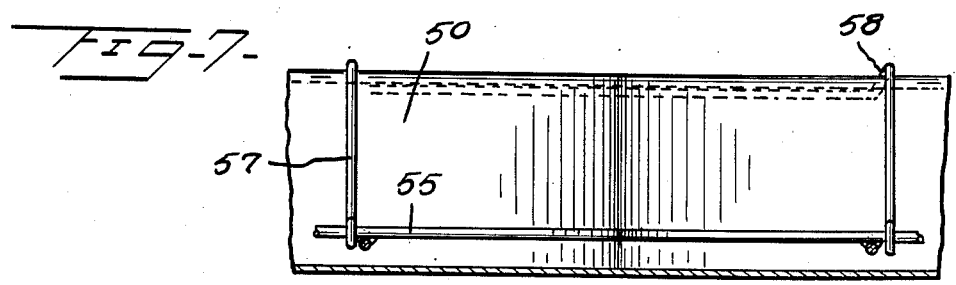
INVENTOR
LUIS SAMUEL GUTHOF
BY Kimmel & Crowell
ATTORNEYS June 9, 1953 — L. S. GUTHOF — 2,641,246
COOKING DEVICE
Filed May 20, 1952 — 4 Sheets-Sheet 3
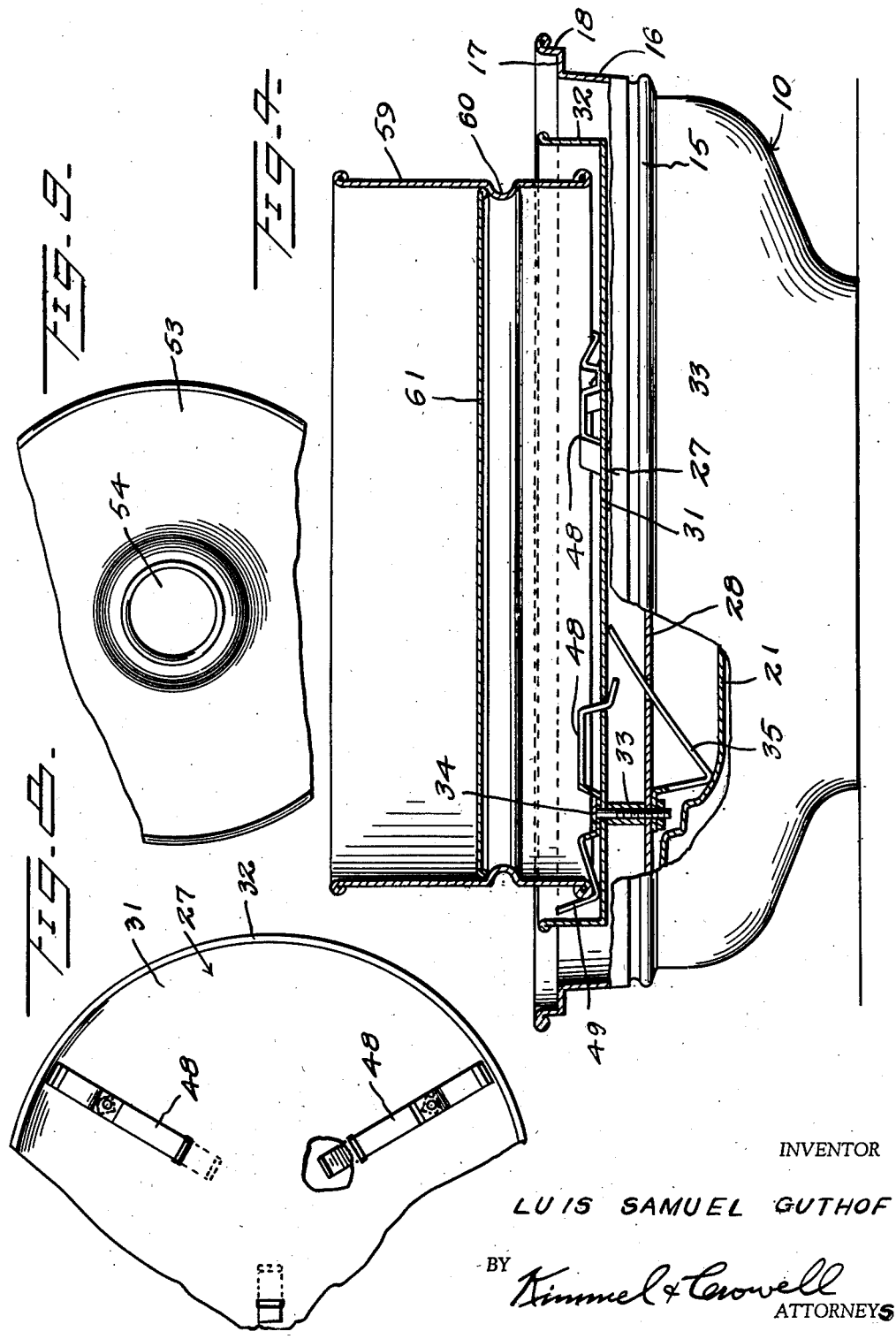
INVENTOR
LUIS SAMUEL GUTHOF
BY Kimmel & Crowell
ATTORNEYS

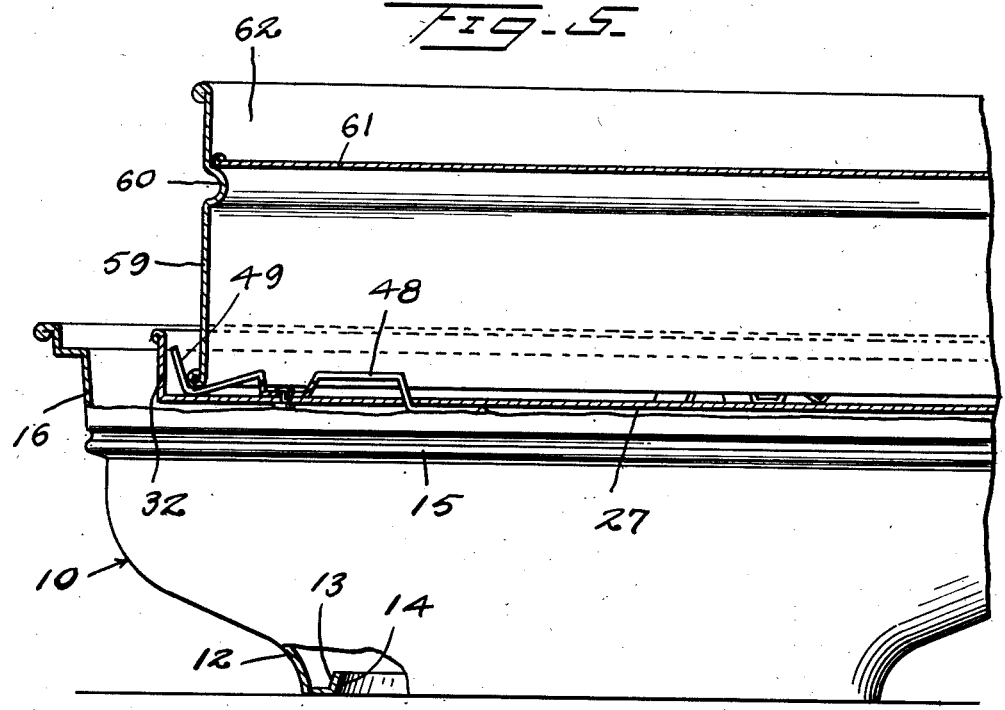
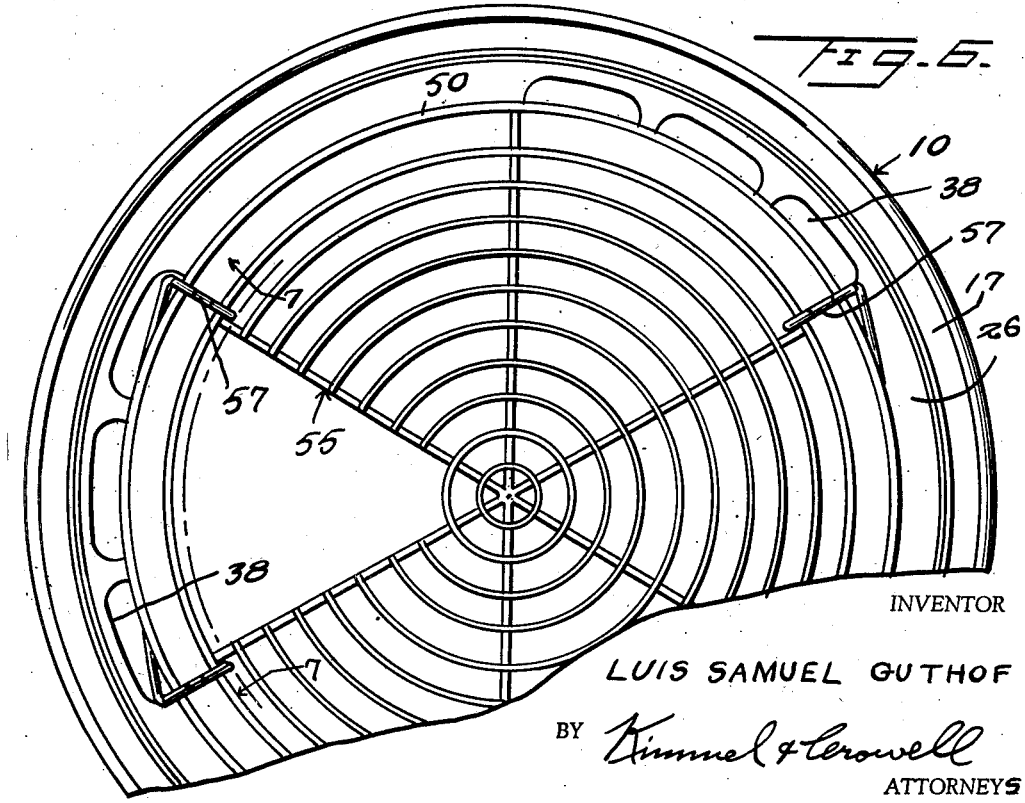

Patented June 9, 1953

2,641,246

UNITED STATES PATENT OFFICE 2,641,246

COOKING DEVICE

Luis Samuel Guthof, Mexico City, Mexico

Application May 20, 1952, Serial No. 288,835

3 Claims. (Cl. 126—275)

1

This invention relates to a cooking device for mounting on top of a stove.

An object of this invention is to provide a cooking device for mounting on top of a stove, such as a gas or electric stove, which will permit baking, broiling or the like for cooking or baking various articles of food.

Another object of this invention is to provide a base unit embodying a lower element and a cover element, with a series of utensils adapted for positioning in the base units whereby different kinds of articles of food may be cooked or baked.

A further object of this invention is to provide a cooking device which includes a heat distributing means for evenly distributing the heat so that various articles of food may be evenly and thoroughly cooked.

With the above and other objects in view, my invention consists in the arrangement, combination and details of construction disclosed in the drawings and specification, and then more particularly pointed out in the appended claims.

In the drawings:

Figure 2 is a sectional view on an enlarged scale taken on the line 2—2 of Figure 1.

Figure 4 is a sectional view partly broken away and partly in elevation showing another arrangement of cooking utensils mounted in the device.

Figure 5 is a fragmentary vertical section partly in elevation showing another arrangement of cooking utensils mounted in the base of the device.

Figure 6 is a plan view of the device with a grill mounted in one of the cooking utensils.

Figure 7 is a fragmentary sectional view taken on the line 7—7 of Figure 6.

Figure 8 is a fragmentary plan view of the inner baffle structure carried by the base.

Figure 9 is a fragmentary plan view of the inner cover for the cooking or baking utensils.

Figure 1:
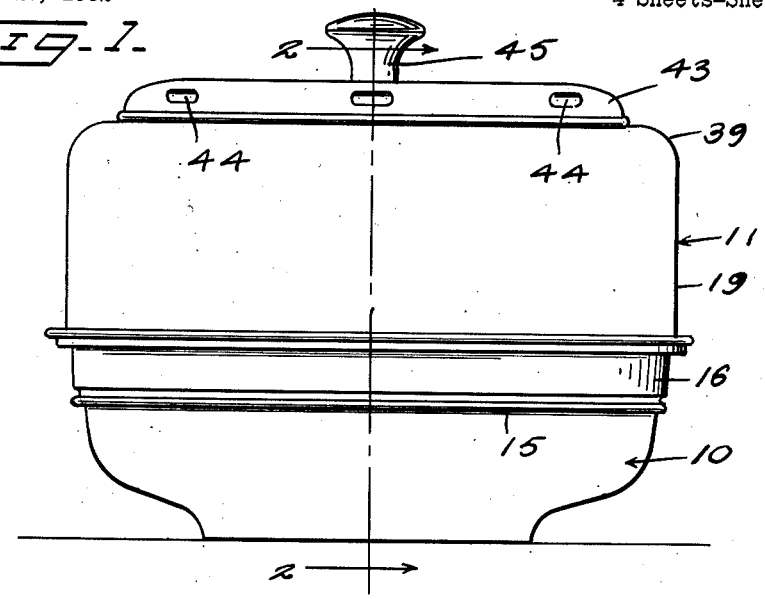
Figure 1 is a detailed side elevation of a cooking or baking device constructed according to an embodiment of this invention.

Referring to the drawings, the numeral 10 designates generally a base structure and the numeral 11 designates generally a cover which is removably mounted on the base structure 10. The base structure 10 is formed of an upwardly flared side wall 12 having a reverted lower edge 13 and a relatively large central opening 14.

2

The lower edge 13 is adapted to be seated about a burner so that the heat from the burner is adapted to rise upwardly through the opening 14. The side wall 12 extends upwardly on a reverse curve and is formed with an outwardly offset bead 15, with a substantially cylindrical wall 16 extending upwardly from the bead 15.

The upper end of the wall 16 has extending outwardly therefrom a horizontal flange 17, and an annular flange 18 extends upwardly from the outer edge of the flange 17. The lower edge of the cylindrical side wall 19 of the cover 11 is adapted to seat on the flange 17 and within the rim or annular flange 18.

The base 10 also includes a baffle member generally designated as 20. The baffle member 20 is formed of a horizontal plate 21 having an upturned marginal edge 22, which is formed with an offset annular flange 23, and an upwardly projecting flange 24 extends from the flange 23.

An outwardly extending substantially horizontal member 25 extends from the annular flange 24, and an outwardly projecting rim 26 is upwardly offset from the horizontal member 25 and is adapted to seat in the concave inner side of the bead 15. A removable baffle structure generally designated as 27 is also mounted within the base 10 and comprises a bottom plate 28 formed with an upturned marginal edge 29 terminating in an outwardly projecting rim 30, which is adapted to overlie the rim 26.

The baffle structure 27 also includes an upper baffle plate 31 of substantially disc shape which is formed with an outer vertical annular flange 32. The two plates 28 and 31 are held in spaced apart relation by spacer members 33, and securing members 34 extend through the plates 28 and 31 and through the spacer members 33.

A plurality of V-shaped supporting feet 35 are secured to the fastening members 34 below the plate 28, and one side of each supporting member of leg 35 projects upwardly through an opening 36 formed in the lower plate 28.

The upper inner end of the leg 37 bears against the lower side of the plate 31. The legs 35 provide a means for holding baffle structure 27 substantially concentric with the stationary or fixed baffle 20. The marginal member 26 carried by the baffle member 20 is formed with a plurality of openings 38 through which heated air is adapted to pass.

The cylindrical side wall 19 of the cover 11 is formed with an inturned upper portion 39 which merges on a reverse curvature on an upwardly dished top wall 40 having openings 41. Outer wall 42, which is formed with a downwardly bent outer edge 43, engages about the top wall 40 and is formed with a plurality of openings 44.

A knob 45 is disposed centrally of the outer wall 42 and is provided with a bolt 46 extending through the wall 42 and the top wall 40. A nut 47 threaded on the bolt 46 holds the wall 42 tightly on the top wall 40. The pan-shaped baffle, formed by the wall 31 and the flange 32, has a plurality of circumferentially spaced apart utensil supporting members 48 secured to the upper side of the wall 31. These utensil supporting members 48 are provided at their outer ends with upturned arms 49 which serve as a utensil centralizing means for holding a utensil, such as a baking dish or pan 50, within the baffle structure 27.

The pan 50 is designed as one assembly for use in baking cake or the like, and a cone-shaped member 51, which is formed with an outwardly flared lower wall 52, is disposed within the pan 50 and is adapted to provide a central opening or hole within a cake or other article of food which is baked within the pan 50.

A flanged pan cover 53, having a knob 54 is adapted to engage over the upper edge of the pan 50.

Figure 3:
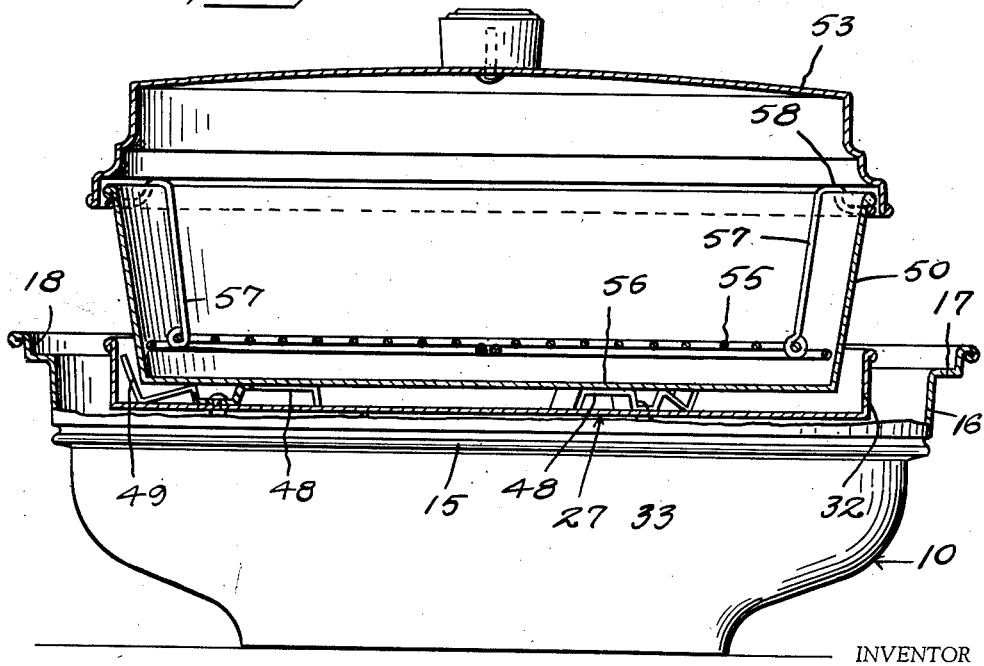
Figure 3 is a vertical section partly in detail showing the device with the cover removed and a different arrangement or assembly of cooking utensils mounted therein which are different from the utensils shown in Figure 2.

Referring now to Figure 3, there is disclosed another arrangement of cooking utensils or dishes adapted to be used with the base and cover structure. The pan 50, having the cover 53, is provided with a grill or grid 55, and the latter is suspended within the pan 50 above the bottom 56 of the pan by means of inverted U-shaped supporting members 57. The supporting members 57 are formed with hook-shaped upper portions 58, which are adapted to hook over the rim of the pan 50.

Referring now to Figure 4, there is disclosed another form of utensil or baking dish which includes a cylindrical member 59 having an inwardly offset bead 60 disposed between the ends thereof. A disc-shaped removable bottom 61 is adapted to engage on the bead 60 so as to provide a relatively deep pan for baking cake or other articles of food.

In Figure 5, the cylindrical member 59 is reversed, with the bead 60 supporting the disc 61, and the reversing of the cylindrical member 59 forms a relatively shallow pan 62 for baking of pies or the like.

I do not mean to confine myself to the exact details of construction herein disclosed, but claim all variations falling within the purview of the appended claims.

What is claimed is:

1. A cooking device comprising a base structure adapted to be mounted over a burner, and a cover engageable on said base structure, said base structure comprising an upwardly flared side wall having an outwardly offset bead below the upper end thereof, an outwardly offset rim carried by the upper end of the side wall, a lower baffle fixed in said side wall, said lower baffle including a downwardly offset central portion with a circular flange seating in said bead, said flange having a series of openings therein, and removable baffle means seating in said central portion of said lower baffle, said removable baffle means comprising a pair of spaced apart plates, spacer means between said plates, and V-shaped legs extending below said plates and engaging in said lower baffle.

2. A cooking device comprising a base structure adapted to be mounted over a burner, and a cover engageable on said base structure, said base structure comprising an upwardly flared side wall having an outwardly offset bead below the upper end thereof, an outwardly offset rim carried by the upper end of the side wall, a lower baffle fixed in said side wall, said lower baffle including a downwardly offset central portion with a circular flange seating in said bead, said flange having a series of openings therein, and removable baffle means seating in said central portion of said lower baffle, said removable baffle means comprising a pair of spaced apart plates, spacer means between said plates, V-shaped legs extending below said plates and engaging in said lower baffle, and upwardly offset pan supporting members carried by said removable baffle means.

3. A cooking device comprising a base structure adapted to be mounted over a burner, and a cover engageable on said base structure, said base structure comprising an upwardly flared side wall having an outwardly offset bead below the upper end thereof, an outwardly offset rim carried by the upper end of the side wall, a lower baffle fixed in said side wall, said lower baffle including a downwardly offset central portion with a circular flange seating in said bead, said flange having a series of openings therein, and removable baffle means seating in said central portion of said lower baffle, said removable baffle means comprising a pair of spaced apart plates, spacer means between said plates, V-shaped legs extending below said plates and engaging in said lower baffle, said cover comprising a cylindrical side wall and inner and outer top walls formed with non-registering vent openings.

LUIS SAMUEL GUTHOF.

References Cited in the file of this patent

UNITED STATES PATENTS

| Number | Name | Date |
|---|---|---|
| 319,003 | McDonald et al. | June 2, 1885 |
| 643,916 | Sloan | Feb. 20, 1900 |
| 1,087,402 | Sauvage | Feb. 17, 1914 |
| 1,436,989 | Lehmann | Nov. 28, 1922 |
| 1,611,087 | Sussman | Dec. 14, 1926 |
| 1,723,413 | Drehmann | Aug. 6, 1929 |
| 2,502,233 | Rom | Mar. 28, 1950 |